US009501528B2

(12) United States Patent
Chang et al.

(10) Patent No.: US 9,501,528 B2
(45) Date of Patent: Nov. 22, 2016

(54) EFFICIENT RESPONSE OF COMMON INFORMATION MODEL (CIM) SERVER

(75) Inventors: Hancock Y C Chang, Taipei (TW); Chang Wei-Chien, Taipei (TW); Ku-Lan Kao, Taipei (TW); Ku Chang Kuo, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 13/223,191

(22) Filed: Aug. 31, 2011

(65) Prior Publication Data
US 2012/0054319 A1 Mar. 1, 2012

(30) Foreign Application Priority Data

Aug. 31, 2010 (TW) ................................ 99129362 A

(51) Int. Cl.
*G06F 15/16* (2006.01)
*G06F 17/30* (2006.01)
*H04L 12/24* (2006.01)

(52) U.S. Cl.
CPC ......... *G06F 17/3048* (2013.01); *H04L 41/024* (2013.01); *H04L 41/0213* (2013.01)

(58) Field of Classification Search
CPC ............... H04L 67/06; H04L 67/2842; H04L 29/08117; H04L 29/08729; H04L 17/3048; H04L 41/0213; H04L 41/024; G06F 17/3048
USPC .......................................................... 709/219
See application file for complete search history.

(56) References Cited

U.S. PATENT DOCUMENTS

| 6,760,812 B1* | 7/2004 | Degenaro ........... G06F 12/0888 707/E17.12 |
| 7,043,738 B2 | 5/2006 | Mandal et al. |
| 7,155,501 B2 | 12/2006 | Mandal et al. |
| 8,521,967 B1* | 8/2013 | Karamcheti ............ G06F 13/00 709/213 |
| 2002/0199022 A1* | 12/2002 | Tsang et al. .................. 709/246 |
| 2004/0181529 A1* | 9/2004 | Hiltgen et al. .................... 707/9 |
| 2004/0249926 A1* | 12/2004 | Cheng et al. .................. 709/223 |

(Continued)

FOREIGN PATENT DOCUMENTS

| CN | 101594376 | 12/2009 |
| TW | I265697 | 11/2006 |

OTHER PUBLICATIONS

Carey et al., "Integrating CIM/WBEM with the Java Enterprise Model," Adaptive Wireless Systems Group, Department of Electronic Engineering, Cork Institute of Technology, Cork, Ireland.

(Continued)

*Primary Examiner* — Bryan Lee
(74) *Attorney, Agent, or Firm* — Zilka-Kotab, PC

(57) ABSTRACT

Once a request is received from a common information model (CIM) Object Manager (CIMOM), a CIM server may respond quickly and efficiently by utilizing data which is stored in advance of the request from the CIMOM. This previously stored copy of soon-to-be-requested data may be stored in anticipation of receiving the request from the CIMOM for the data, and may be quickly returned to the CIMOM upon receiving the request for it. A CIM profile provider may generate this pre-stored data for a device in order to respond to the request, and a CIM caching provider may receive the data, store the data, receive the request for the data, and provide the data in response to the request, according to one embodiment.

14 Claims, 9 Drawing Sheets

(56) References Cited

U.S. PATENT DOCUMENTS

| | | | |
|---|---|---|---|
| 2007/0073877 A1* | 3/2007 | Boykin et al. | 709/225 |
| 2007/0299951 A1* | 12/2007 | Krithivas | 709/223 |
| 2009/0007144 A1* | 1/2009 | Blue et al. | 719/318 |
| 2009/0113447 A1* | 4/2009 | Kamiyai et al. | 719/314 |
| 2009/0271569 A1 | 10/2009 | Kannan | |
| 2009/0271573 A1* | 10/2009 | Kannan | 711/129 |
| 2009/0287667 A1 | 11/2009 | Kannan | |
| 2010/0017410 A1 | 1/2010 | Pankaj et al. | |
| 2010/0030969 A1 | 2/2010 | Basham et al. | |
| 2010/0058339 A1 | 3/2010 | Beilmann et al. | |
| 2010/0217995 A1* | 8/2010 | Enoki | G06F 17/3048 713/178 |
| 2011/0161402 A1* | 6/2011 | Anderson et al. | 709/203 |
| 2012/0017034 A1* | 1/2012 | Maheshwari et al. | 711/103 |

OTHER PUBLICATIONS

Office Action from Taiwanese Application No. 099129362 dated Apr. 10, 2014.

* cited by examiner

EFFICIENT RESPONSE OF COMMON INFORMATION MODEL (CIM) SERVER

RELATED APPLICATIONS

This application claims priority from Taiwan Patent Application No. 99129362, filed Aug. 31, 2010, and incorporated herein by reference.

BACKGROUND

The present invention relates to Common Information Model (CIM) servers, and more particularly, to enabling efficient responses to requests sent from a CIM object manager (CIMOM).

A CIM is an information management standard set forth by the Distributed Management Task Force (DMTF). Applications and apparatuses for use on different platforms may be controlled in the same way using a CIMOM and/or a software management program.

The CIM is the foundation for the DMTF technology solution to distributed enterprise management. CIM is an object-oriented management information model based on Unified Modeling Language (UML) which provides a conceptual framework for describing management data. The CIM Infrastructure Specification defines the meta schema, syntax, rule and Managed Object Format (MOF). The MOF syntax is based on the Interface Definition Language (IDL) and provides a method of describing CIM Object definitions in a textual form. The CIM Schema provides a common conceptual framework used to describe a managed environment.

Conventionally, CIM provides a common definition of management information for systems, networks, applications, and services, and allows for vendor extensions. CIM's common definitions enable vendors to exchange semantically rich management information between systems throughout the network.

CIM is traditionally composed of a Specification and a Schema. The Schema provides the actual model descriptions, while the Specification defines the details for integration with other management models.

The CIM release simultaneously provides the public with both an "Experimental" and a "Final" version of the schema. This provides DMTF members and end users with early access to experimental parts of the models. In addition, new versions of CIM are now released more frequently on a regularly scheduled basis allowing users greater access and the ability to plan accordingly.

As part of the conventional CIM release, a number of enhancements and additions are introduced throughout the Schema, including ongoing improvements to support product and alliance partners and to support DMTF Profiles and Management Initiatives. Examples include updates to basic input/output system (BIOS), printers, standard messages, operating system state, modern power management paradigms, virtualization, security, etc. In addition, it should be noted that the CIM Schema is built automatically for the DMTF. All of the change requests for the current CIM release are applied programmatically, not manually.

Furthermore, traditional CIM experimental elements may change in a backward incompatible way, which is undesirable. Contributions to the CIM schema have been made possible through the DMTF Alliance Partnerships with The Green Grid (TGG), the Storage Networking Industry Association (SNIA) and the Open Grid Forum (OGF). Therefore, it would be of great utility to provide a CIM server capable of highly efficient response to requests sent from a CIM object manager.

BRIEF SUMMARY

In one embodiment, a system for modeling common information includes logic adapted for generating data for a device in order to respond to a request, logic adapted for receiving the data, logic adapted for storing the data as a copy, logic adapted for receiving a request for the data, and logic adapted for responding to the request with the copy in response to the request.

In another embodiment, a system includes a processing module for use in a Common Information Model (CIM) server, a CIM profile provider adapted for generating data for a device in order to respond to a request, a CIM Object Manager (CIMOM), and a CIM caching provider adapted for receiving the data from the CIM profile provider, storing the data as the copy, receiving the request from the CIMOM, and responding with the copy in response to the request, wherein the CIM profile provider is coupled with the CIMOM and the device, the CIM caching provider is coupled with the CIMOM and the CIM profile provider, and the processing module receives the request from the CIMOM, and sends the request to either the CIM caching provider or the CIM profile provider depending on a determination.

In another embodiment, a method for efficient response of a CIM server including a CIM profile provider, a CIM caching provider, and a CIMOM includes generating data for a device coupled with the CIM server using the CIM profile provider in order to respond to the CIMOM, receiving the data from the CIM profile provider, storing the data as a copy using the CIM caching provider, and in response to receiving a request from the CIMOM, responding to the request with the copy using the CIM caching provider.

According to yet another embodiment, a computer program product for efficient response of a CIM server includes a computer-readable storage medium having computer-readable program code embodied therewith, the computer-readable program code including computer-readable program code configured to: generate data for a device coupled with the CIM server in order to respond to a CIMOM, receive the data, store the data as a copy, and respond with the copy to a request from the CIMOM in response to receiving the request, wherein the computer-readable program code configured to store the data as the copy and the computer-readable program code configured to respond with the copy to the request from the CIMOM is embedded in a CIM caching provider, and the computer-readable program code configured to generate data for the device coupled with the CIM server in order to respond to the CIMOM is embedded in a CIM profile provider.

Other aspects and embodiments of the present invention will become apparent from the following detailed description, which, when taken in conjunction with the drawings, illustrate by way of example the principles of the invention.

DETAILED DESCRIPTION

Figure 1:
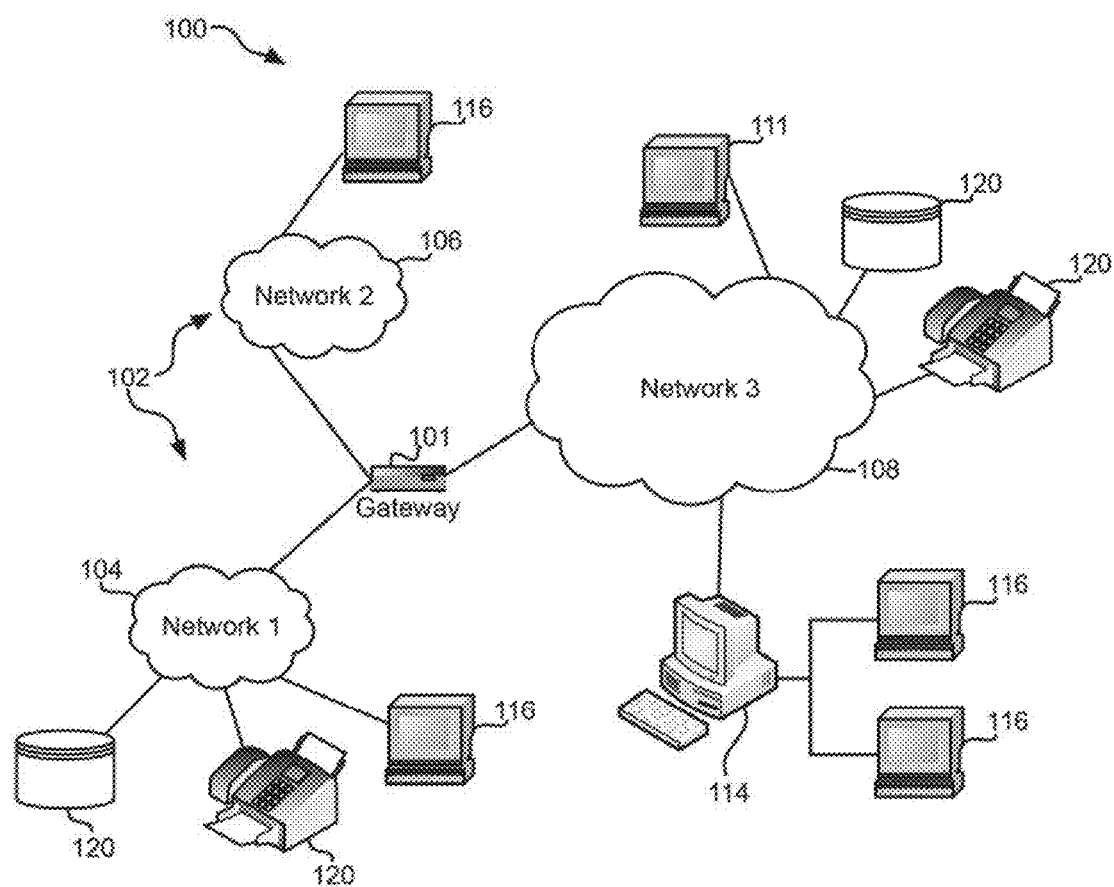
FIG. 1 illustrates a network architecture, in accordance with one embodiment.

The following description is made for the purpose of illustrating the general principles of the present invention and is not meant to limit the inventive concepts claimed herein. Further, particular features described herein may be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for efficient and fast response of a common information model (CIM) server to a request from a CIM Object Manager (CIMOM), and may be carried out using data stored in advance of the request from the CIMOM. For example, upon receiving the request, the pre-stored copy of the requested data can be quickly returned to the CIMOM.

In one general embodiment, a system for modeling common information includes logic adapted for generating data for a device in order to respond to a request, logic adapted for receiving the data, logic adapted for storing the data as a copy, logic adapted for receiving a request for the data, and logic adapted for responding to the request with the copy in response to the request.

In another general embodiment, a system includes a processing module for use in a CIM server, a UM profile provider adapted for generating data for a device in order to respond to a request, a CIMOM, and a CIM caching provider adapted for receiving the data from the CIM profile provider, storing the data as the copy, receiving the request from the CIMOM, and responding with the copy in response to the request, wherein the CIM profile provider is coupled with the CIMOM and the device, the CIM caching provider is coupled with the CIMOM and the CIM profile provider, and the processing module receives the request from the CIMOM, and sends the request to either the CIM caching provider or the CIM profile provider depending on a determination.

In another general embodiment, a method for efficient response of a CIM server including a CIM profile provider, a CIM caching provider, and a CIMOM includes generating data for a device coupled with the CIM server using the CIM profile provider in order to respond to the CIMOM, receiving the data from the CIM profile provider, storing the data as a copy using the CIM caching provider, and in response to receiving a request from the CIMOM, responding to the request with the copy using the CIM caching provider.

According to yet another general embodiment, a computer program product for efficient response of a CIM server includes a computer-readable storage medium having computer-readable program code embodied therewith, the computer-readable program code including computer-readable program code configured to: generate data for a device coupled with the CIM server in order to respond to a CIMOM, receive the data, store the data as a copy, and respond with the copy to a request from the CIMOM in response to receiving the request, wherein the computer-readable program code configured to store the data as the copy and the computer-readable program code configured to respond with the copy to the request from the CIMOM is embedded in a CIM caching provider, and the computer-readable program code configured to generate data for the device coupled with the CIM server in order to respond to the CIMOM is embedded in a CIM profile provider.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium (e.g., a non-transitory computer-readable medium). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that may contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that may communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that may direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
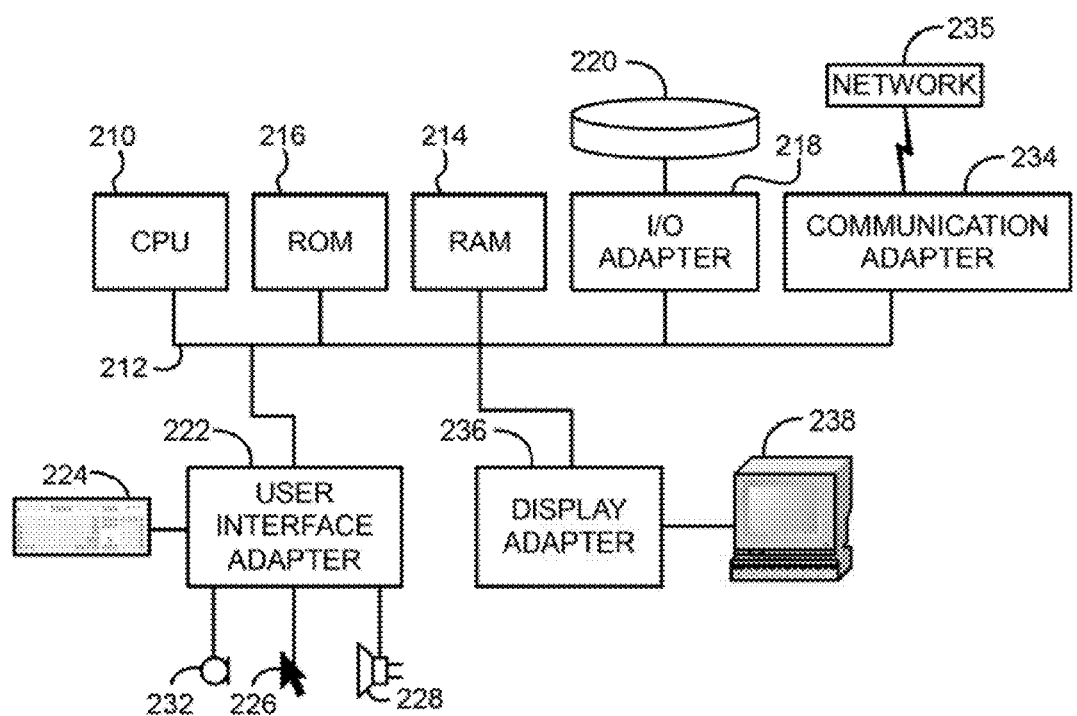
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

The present invention is described herein with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that may direct a computer or other programmable data processing apparatus to function in a particular manner, such that the instructions stored in the computer-readable medium produce an article of manufacture including instructions which implement the function/act specified in the flowchart and/or block diagram block or blocks, according to various embodiments described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks, according to various embodiments described herein.

Referring now to FIGS. 3 through 8, systems, devices, methods, and computer program products are described using structural or functional block diagrams or process flowcharts, according to various embodiments. The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Figure 3:
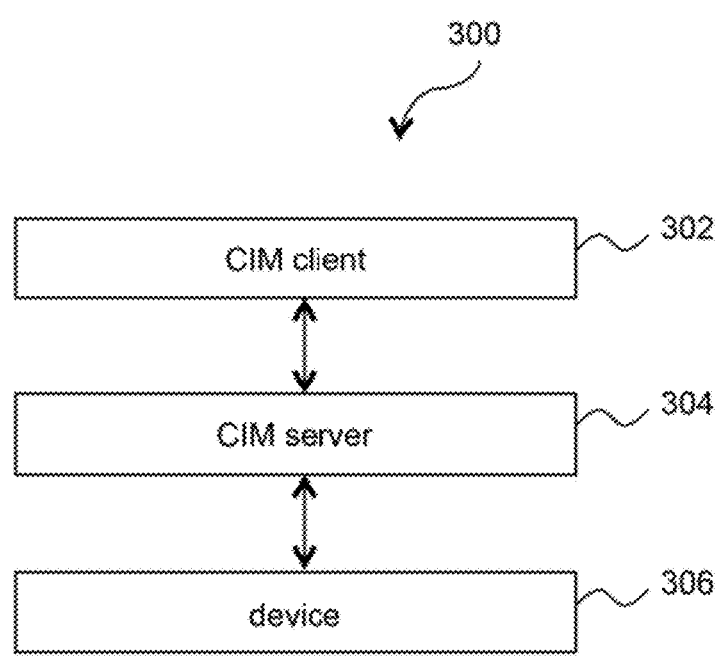
FIG. 3 illustrates a schematic view of the architecture of a system, according to one embodiment.

FIG. 3 shows a block diagram of a system architecture 300 that includes a Common Information Model (CIM) client 302, a CIM server 304, and a Managed device 306 (for example, a BIOS, a processor, a memory, a fan, etc.) in one embodiment. In this embodiment, the CIM client 302, the CIM server 304, and the managed device 306 belong to the same computer device (such as an IBM®, a BladeCenter®, a System X® server, or some other server) ("IBM," "BladeCenter," and "System X" are registered trademarks of International Business Machine in the USA and/or other countries). Communication between the CIM client 302 and the CIM server 304 may be effectuated in a CIM-XML language according to one embodiment. The CIM server 304 may communicate with the device 306 through the Intelligent Platform Management Interface (IPMI) in one approach. The embodiments described herein are not restrictive of the quantity of devices 306, and disclose only one device 306 for illustrative purposes; however, as would be known to one of skill in the art, any number of devices 306 may be present.

In some embodiments, the CIM client 302, the CIM server 304, and the managed device(s) 306 may belong to different computer devices and be connected together by a network (not shown). For example, the CIM client 302 may communicate with the CIM server 304 by hyper-text markup language (HTTP) and/or in a CIM-XML language, and the CIM server 304 may communicate with the device 306 through the IPMI over a LAN, in one approach. Of course, many other communication arrangements may be possible, and are not limited in any way by the illustrative embodiments presented herein. Any communication arrangement may be used, as would be apparent to one of skill in the art upon reading the present descriptions.

Figure 4:
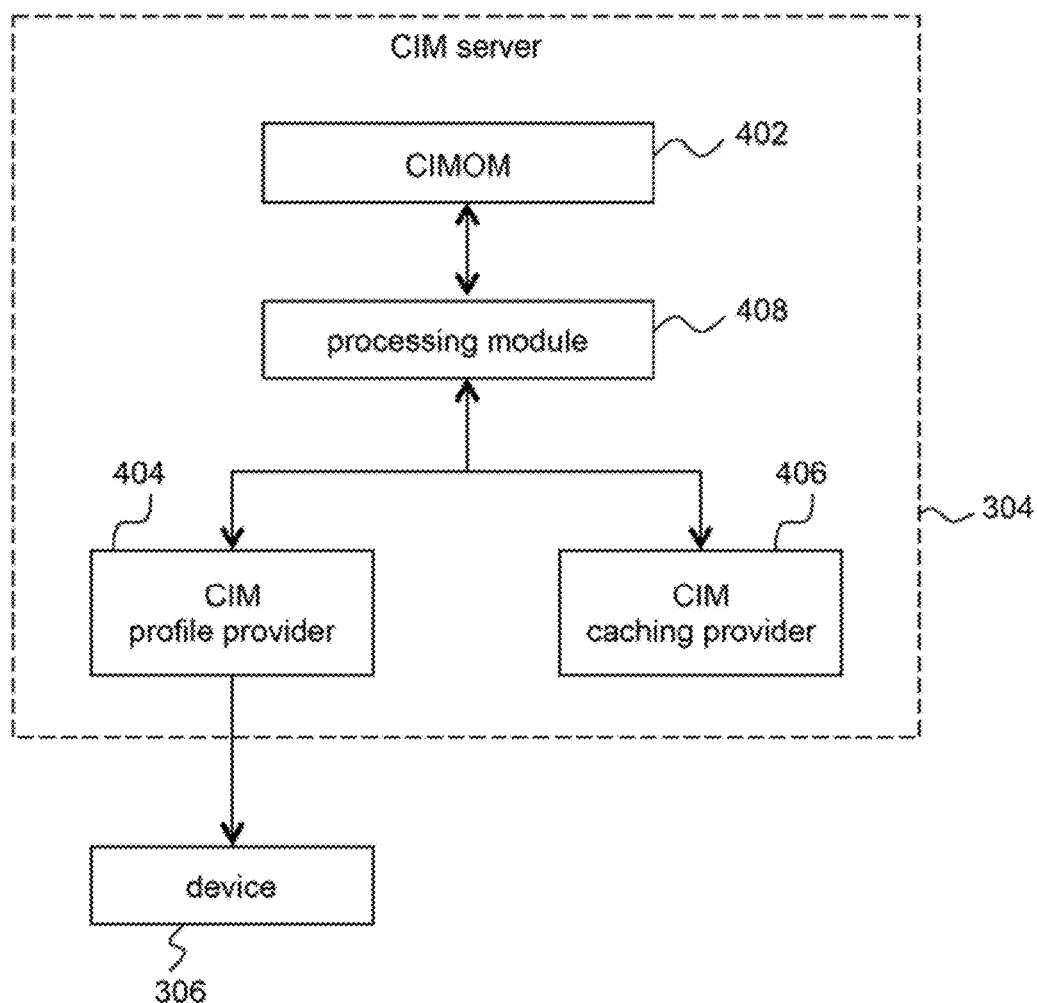
FIG. 4 is a schematic view of a CIM server, according to one embodiment.

FIG. 4 further illustrates operation of the CIM server 304, according to another embodiment. As shown, the CIM server 304 has a CIM Object Manager (CIMOM) 202, a CIM profile provider 404, a CIM caching provider 406, and a processing module 408. In one embodiment, the CIM profile provider 404, the CIM caching provider 406, and the processing module 408 may be disposed on the CIM server 304 using a plug-in or through embedding, as would be understood by one of skill in the art.

The CIM profile provider 404 may also be known as a device provider, in some embodiments. According to the Distributed Management Task Force (DMTF), a profile in the CIM may define operation of a CIM model in a specific environment. In such a case, the CIM profile provider 404 contents may include one or more of a class, an association, a method, and a property of the CIM. For a given profile, uniformity and convenience may be manifested by application of the CIM model under a specific conditions. Several such exemplary sample profiles are known in the art and available for inclusion herein, as would be understood by one of skill in the art.

In one embodiment, the CIM profile provider 404 registers with the CIMOM 402 in advance, so as to communicate with the CIMOM 402 and the device 306. Conversely, the CIM caching provider 406 does not communicate with the device 306, according to one approach.

In other embodiments (not shown), the CIMOM 402, the CIM profile provider 404, the CIM caching provider 406, and the processing module 408 may be disposed at different computer devices, respectively, and communicate with each other through a connecting network, for example by HTTP, and in a CIM-XML language, according to one approach.

Figure 5:
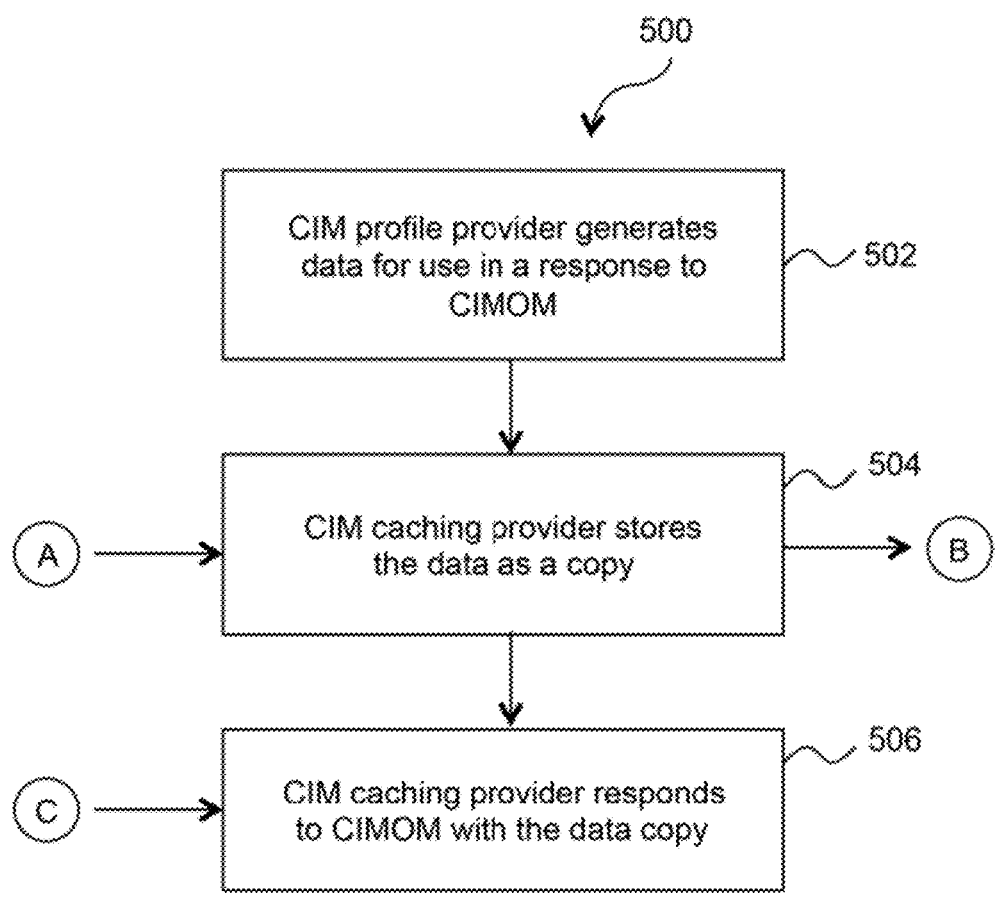
FIG. 5 is a flowchart of a method, according to one embodiment.

FIG. 5 is a flowchart of a method 500, according to one embodiment, and describes one embodiment briefly in conjunction with FIGS. 3-4. In step 502, the CIM server 304 loads the CIM profile provider 404 that has already registered with the CIMOM 402 and operates in response to the device 306 so as to generate data for use in a response to the CIMOM 402. This step is performed in response to a request sent from the CIMOM 402 to the CIM profile provider 404, or performed in an uninvited manner by the CIM profile provider 404 in accordance with a preset condition prior to the receipt of a request from the CIMOM 402, or performed to serve as a procedure of initialization of the CIM server 304. Furthermore, the "data for use in a response to the CIMOM" disclosed herein includes, but is not limited to, an "instance" as set forth in the CIM Tutorial by the DMTF, among other options as would be apparent to one of skill in the art upon reading the present descriptions.

In step 504, the CIM server 304 loads and executes the CIM caching provider 406 to receive from the CIM profile provider 404 the data generated in step 502 and then stores the received data as a copy. In order to save storage space, in preferred embodiments, it is desirable to store the copy in a compressed format (for example, by LZ data compression, etc.).

In step 506, the CIMOM 402 sends a request (such as a request sent in response to the CIM client 302), to cause the processing module 408 to perform a determination (described below and depicted in FIG. 7) on the request and sends the request to the CIM caching provider 406, according to one approach. Preferably, the CIM server 304 loads the CIM caching provider 406 persistently (i.e., not unloaded yet), such that the CIM caching provider 406 may respond to the CIMOM 402 promptly with the data copy stored in step 504. If the CIM caching provider 406 adopts compressed storage in step 504, the CIM caching provider 406 will, in this step, decompress the copy before responding to the CIMOM 402.

Accordingly, the CIM server 304 may respond to the CIMOM 402 without reloading and executing the CIM profile provider 404, thereby enhancing the efficiency of response to the CIMOM 402 and reducing the consumption of resources available to a processor. Furthermore, since the CIM caching provider 406 provides the data copy for the CIM profile provider 404, it is possible but not necessary for the CIM caching provider 406 to register with the CIMOM 402; hence, it is easy to implement the present invention, because it is not necessary for the CIMOM 402 to be aware of the presence of the CIM caching provider 406.

Figure 6:
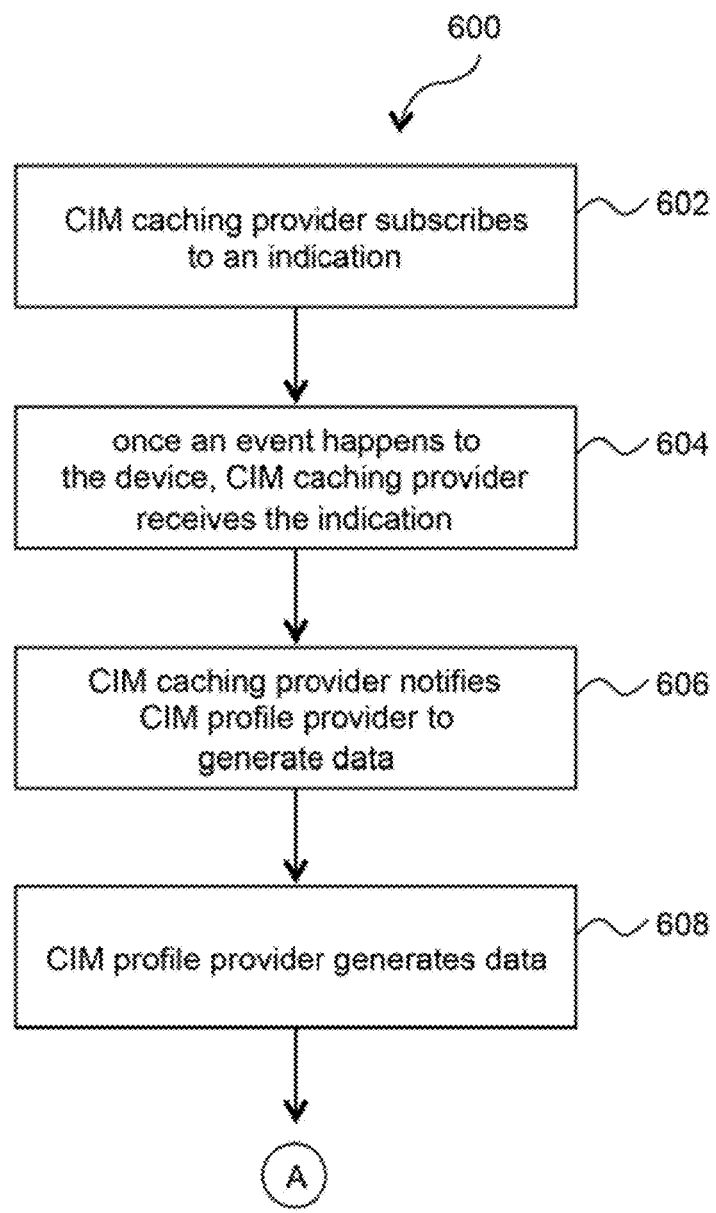
FIG. 6 is a flowchart of a method, according to one embodiment.

FIG. 6 is a flowchart of a method 600, according to another embodiment. Method 600 may be used in conjunction with method 500 depicted and described in FIG. 5, in one embodiment, as described later. Referring again to FIG. 6 with reference again to FIGS. 3-4, in step 602, the CIM caching provider 406 accesses an indication provider (not shown) of the CIMOM 402 in order to subscribe to an indication (indication), wherein the indication relates to an event regarding the device 306.

In step 604, once an event (such as a failure or a predetermined change) is registered by the device 306, the device 306 will inform the CIMOM 402 of the event, such as through IPMI for example, and then the CIMOM 402 will send an indication to the CIM caching provider 406 to inform the CIM caching provider 406 of the event.

In step 606, after receiving the indication, the CIM caching provider 406 notifies the processing module 408 to instruct the CIM profile provider 404 to perform a corresponding process (see the description of step 608). With the processing module 408 being adapted to communicate with the CIM profile provider 404 as well as any other said CIM profile provider 404 not shown in the drawings, it is advantageous to enable the processing module 408 to operate easily in the following manner: the CIM caching provider 406 sends a predefined message ID to the processing module 408, and, upon receipt of the message ID, the processing module 408 determines a communication recipient and a communication content promptly. For example, the message ID is generated according to the indication received by the CIM caching provider 406. A point to note is that it is feasible to dispense with the processing module 408 in the other embodiments of step 606 so that the CIM caching provider 406 directly notifies the CIM profile provider 404 to perform a corresponding operation (see the description of step 608).

In step 608, upon receipt of the instruction from the processing module 408 (or the CIM caching provider 406), the CIM profile provider 404 performs an operation directed at the device 306, so as to generate data for use in a response to the CIMOM 402. Step 608 is similar to steps 504 and 506 shown in FIG. 5 except that, in step 608, although the CIM profile provider 404 does not actually receive a request sent from the CIMOM 402; the CIM profile provider 404 generates the latest data and sends the latest data to the CIM caching provider 406 to store the latest data as the copy and perform steps 504-506 shown in FIG. 5, as denoted by circle "A" in FIGS. 5-6.

Figure 7:
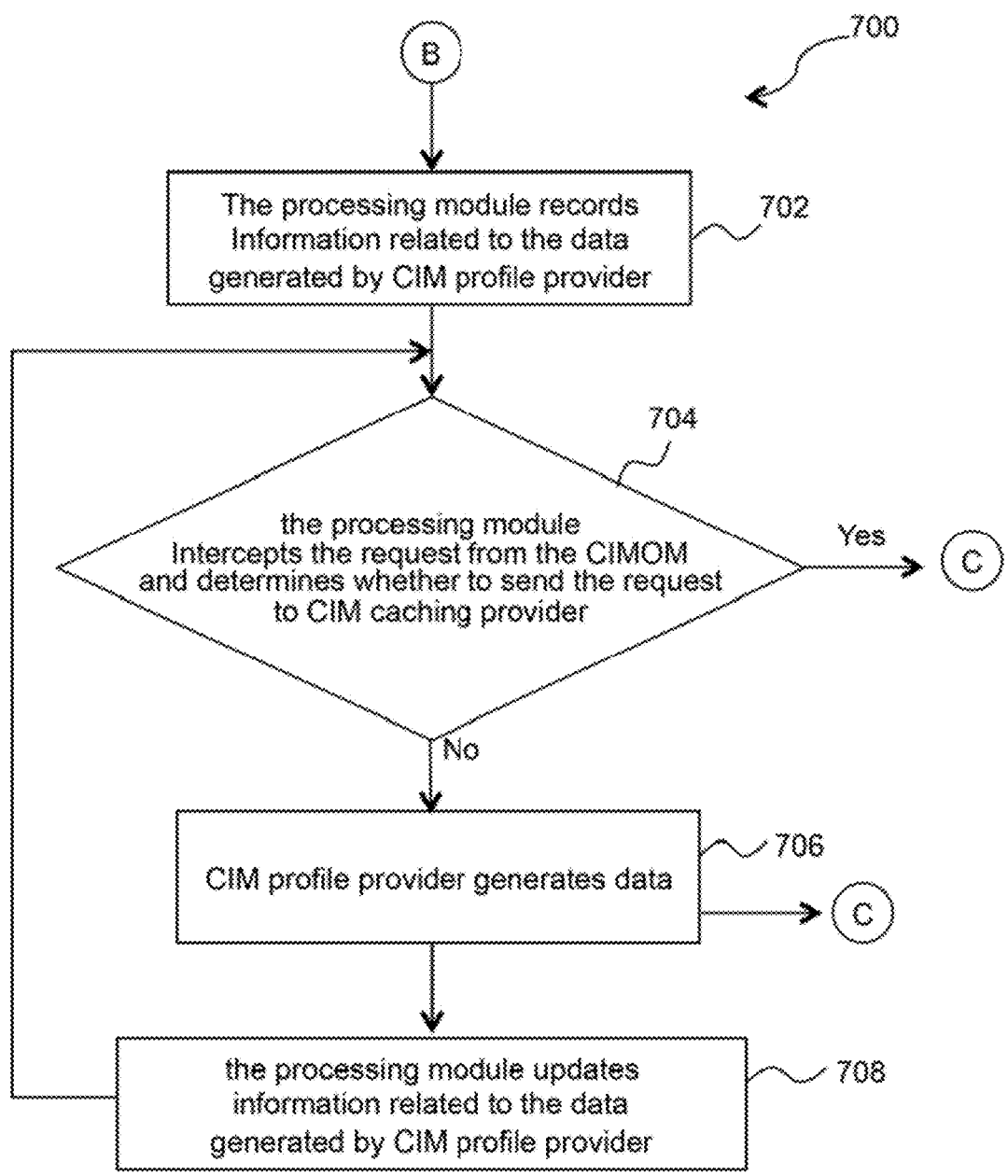
FIG. 7 is a flowchart of a method, according to one embodiment.
Figure 8:
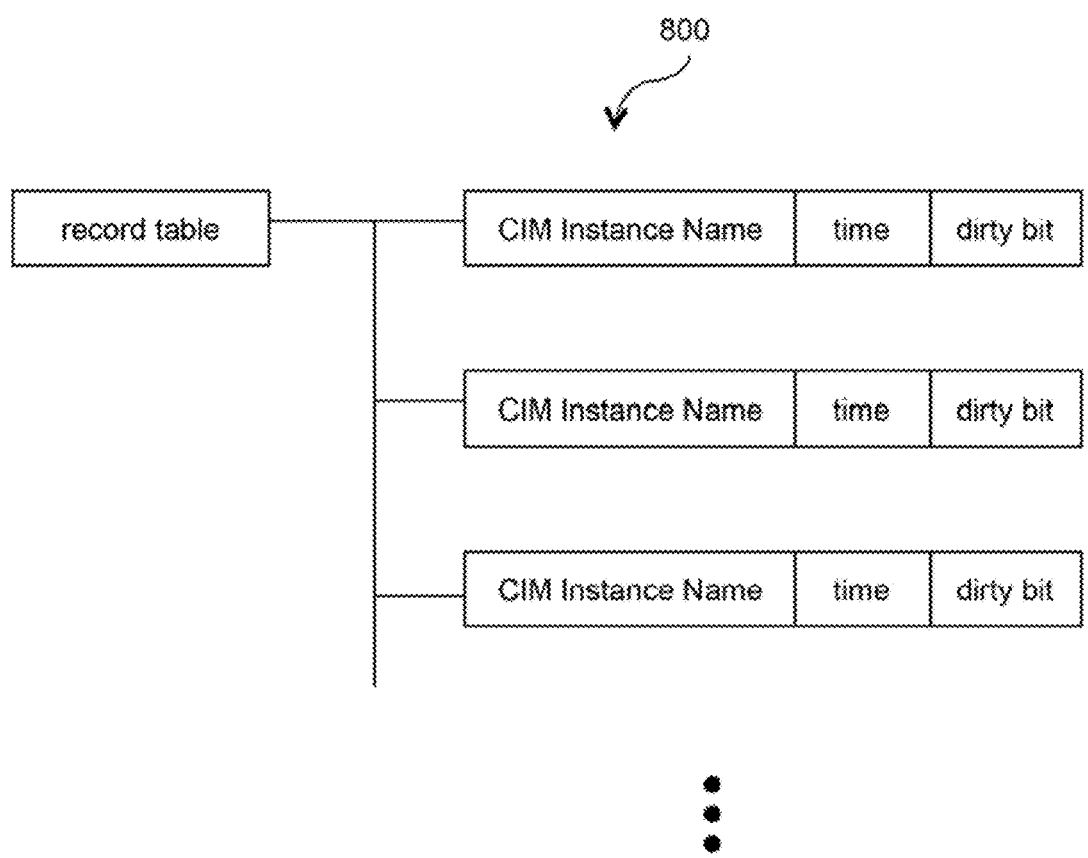
FIG. 8 is a record table of a processing module, according to one embodiment.

FIG. 7 is a flowchart of a method 700, according to another embodiment. Method 700 may be used in conjunction with method 500 depicted and described in FIG. 5, in one embodiment, as described later. In step 504 shown in FIG. 5, the CIM profile provider 404 generates data for use in a response to the CIMOM 402 and sends the data to the CIM caching provider 406 such that the data is stored therein as the copy. Referring again to FIG. 7, method 700 is described with reference to FIGS. 3-5 and 8. In step 702, the processing module 408 records information related to the data. For example, the processing module 408 records a CIM instance name and the time at which the CIM profile provider 404 generates the data (or the time at which the CIM caching provider 406 stores the copy as depicted with reference to circle "B" in FIGS. 5 and 7) contained in the data/copy. Preferably, the processing module 408 has a record table 800 (as shown in FIG. 8). Each of the fields of the record table contains a data and records a CIM instance name and the time at which the data is generated (or the time at which the copy is stored). Preferably, each data contains a "dirty bit" as shown in the record table 800 of FIG. 8. The "dirty bit" denotes whether the data in the copy of the CIM caching provider 406 is in an available state or in a latest state. Hence, for example, in step 606 of FIG. 6, once the processing module 408 receives the notification from the CIM caching provider 406, the dirty bit corresponding to the data may be set to "1" to indicate that the data in the copy of the CIM caching provider 406 is no longer available for use.

Referring again to FIGS. 3-5 and 7, in step 704, upon the CIMOM 402 sending a request to the CIM profile provider 404, the processing module 408 receives the request from the CIMOM 402 before determining whether to send the request to the CIM caching provider 406 according to the information related to the data and recorded in step 702, and then allowing the CIM caching provider 406 to respond to the request of the CIMOM 402 with the data copy stored in the CIM caching provider 406 (step 506 as shown in FIG. 5 and depicted with reference to circle "C" in FIGS. 5 and 7). The processing module 408 sends the request to the CIM caching provider 406 upon an affirmative determination or sends the request to the CIM profile provider 404 upon a negative determination. In one embodiment, the determination may comprise information about timeliness of the copy, e.g., whether the copy is out-of-date or not.

For example, if, in one embodiment, the processing module 408 employs the dirty bit and the dirty hit is set to "1" (which indicates that the data in the copy of the CIM caching provider 406 is no longer available for use), the processing module 408 will send the request to the CIM profile provider 404; or if the duration between the recorded time at which data is generated from the CIM profile provider 404 and the moment when the CIMOM 402 sends out the request has been longer than a predetermined period of time (such as 30 minutes) (which indicates that the data in the copy of the CIM caching provider 406 is probably out of date), the processing module 408 also sends the request to the CIM profile provider 404; or if the processing module 408 discovers that the data required for the request of the CIMOM 402 has not yet been recorded (which indicates that the data in the copy of the CIM caching provider 406 has not yet been generated), the processing module 408 also sends the request to the CIM profile provider 404. Conversely, if it is determined that the data in the copy of the CIM caching provider 406 is in an available state, the processing module 408 will send the request of the CIMOM 402 to the CIM caching provider 406 and respond to the request of the CIMOM 402 with the data copy stored in the CIM caching provider 406 (step 506 shown in FIG. 5).

In step 706, if the processing module 408 sends the request to the CIM profile provider 404, the CIM profile provider 404 will perform an operation directed at the device 306, so as to generate data for use in a response to the CIMOM 402, in a way similar to step 502 of FIG. 5. After step 706, the processing module 408 responds to the CIMOM 402 directly or performs steps 504, 506 of FIG. 5.

In step 708, the processing module 408 also updates the record it keeps about the data in step 702, and, if the processing module 408 employs the dirty bit, the dirty bit will have to be reset to "0" to indicate that the data in the copy of the CIM caching provider 406 is in an available state again.

In more embodiments, receiving the data from the CIM profile provider also may include sending the request to the CIM caching provider from the CIMOM according to a determination. Furthermore, the determination may concern information about timeliness of the copy, e.g., whether the copy is out of date or not.

Figure 9:
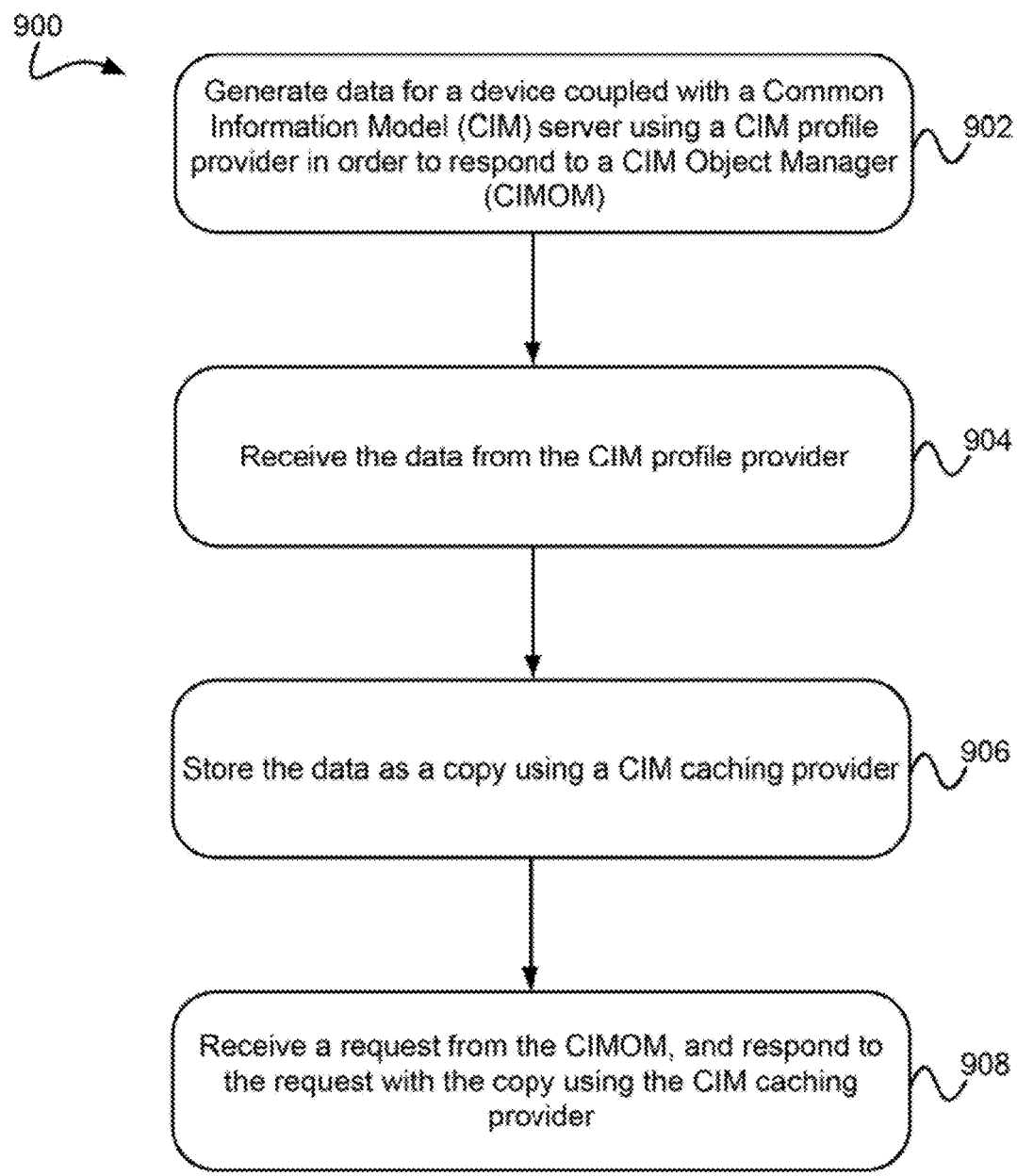
FIG. 9 is a flowchart of a method, according to one embodiment.

In still other embodiments, and with reference to FIG. 9, a process 900 enabling efficient response of a CIM server including a CIM profile provider, a CIM caching provider, and a CIMOM includes first generating data for a device coupled with the CIM server using the CIM profile provider in order to respond to the CIMOM in step 902.

Subsequently, in step 904, the process 900 further includes receiving the data from the CIM profile provider.

In one embodiment of the process 900, the CIM server may store the data as a copy in step 906 using the CIM caching provider.

Furthermore, in response to receiving a request from the CIMOM, the CIM server may respond in step 908 to the request by providing the copy stored in step 904 using the CIM caching provider.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for modeling common information, the system comprising:
   a Common Information Model (CIM) server comprising:
      a processor and logic integrated with and/or executable by the processor, the logic being configured to:
         generate data for a managed device without prompting during initialization of the CIM server in order to respond to a subsequently received request;
         store the data as a copy prior to receiving the request for the data;
         set a bit indicator for the copy in a record table managed by the processor, the bit indicator indicating whether the data in the copy is available for use or not available for use;
         receive the request for the data after generating the data and storing the data as the copy; and
         respond to the request with the copy in response to the request and in response to a determination that the bit indicator indicates that the data in the copy is available for use,
      wherein a Common Information Model (CIM) caching provider is coupled with a CIM Object Manager (CIMOM) and a CIM profile provider, the CIM profile provider also being coupled to the managed device and being configured to generate the data,
      wherein the CIM caching provider is configured to:
         receive the data from the CIM profile provider;
         store the data as the copy in a compressed format;
         receive the request from the CIMOM; and
         respond with the copy in response to the request,
      wherein the record table comprises:
         the data;
         a CIM instance name associated with the data; and
         a time when the data was generated or when the copy was stored, and
      wherein in response to a determination that a duration between the time when the data was generated and a moment when the CIMOM sends out the request is longer than a predetermined period of time, the request is also sent to the CIM profile provider.

2. The system as recited in claim 1, further comprising a subscribing module configured to subscribe to an indication of the CIMOM via an intelligent platform management interface (IPMI) to receive the indication independently of firmware and operating system of the system, and wherein the CIM caching provider is configured to notify the CIM profile provider to update the data as an updated copy and provide the updated copy to the CIM caching provider in response to the subscribing module receiving the indication of the CIMOM.

3. The system as recited in claim 1, wherein the logic is configured to:
set the bit indicator to indicate that the data in the copy is not available for use in response to a predetermined event occurring to the managed device; and
set the bit indicator to indicate that the data in the copy is available for use in response to the data in the copy being updated after the predetermined event has occurred to the managed device,
wherein the predetermined event is chosen from a group consisting of: a failure of the managed device and a predetermined change to the managed device.

4. The system as recited in claim 1, wherein the CIM caching provider is coupled with the CIMOM through a processing module, and wherein the processing module is configured to send to the CIM caching provider the request from the CIMOM according to a determination.

5. A method for efficient response of a Common Information Model (CIM) server, the server comprising a CIM caching provider coupled with a CIM profile provider and a CIM Object Manager (CIMOM), the method comprising:
generating data for a managed device coupled with the CIM server, without prompting using the CIM profile provider during initialization of the CIM profile provider in order to respond to a subsequently received request from the CIMOM with the data for the device, wherein the CIM profile provider is coupled to the managed device;
receiving the data for the device from the CIM profile provider using the CIM caching provider prior to receiving the request for the data;
storing the data as a copy in a compressed format using the CIM caching provider prior to receiving the request for the data;
setting a bit indicator for the copy in a record table managed by the CIM server, the bit indicator indicating whether the data in the copy is available for use or not available for use;
receiving, using the CIM caching provider, the request for the data from the CIMOM after generating the data and storing the data as the copy; and
responding to the request with the copy using the CIM caching provider in response to receiving the request from the CIMOM and in response to a determination that the bit indicator indicates that the data in the copy is available for use,
wherein the record table comprises:
the data;
a CIM instance name associated with the data; and
a time when the data was generated or when the copy was stored, and
wherein in response to a determination that a duration between the time when the data was generated and a moment when the CIMOM sends out the request is longer than a predetermined period of time, the CIMOM also sends the request to the CIM profile provider.

6. A Common Information Model (CIM) server, comprising:
a CIM profile provider configured to generate data for a managed device without prompting during initialization of the CIM profile provider in order to respond to a subsequently received request;
a CIM Object Manager (CIMOM) configured to send the request for the data;
a CIM caching provider configured to receive the data from the CIM profile provider, store the data as a copy prior to receiving the request for the data, receive the request from the CIMOM, and respond with the copy in response to the request; and
a processing module configured to:
receive the request from the CIMOM;
set a bit indicator for the copy in a record table managed by the processing module, the bit indicator indicating whether the data in the copy is available for use or not available for use; and
send the request to either the CIM caching provider or the CIM profile provider based on a determination, wherein the determination informs the processing module whether the bit indicator indicates that the data in the copy is available for use or not available for use, wherein the processing module is coupled to the CIMOM, the CIM profile provider, and the CIM caching provider, wherein the CIM profile provider is coupled with the CIMOM and the managed device, wherein the CIM caching provider is coupled with the CIMOM and the CIM profile provider,
wherein the record table comprises:
the data;
a CIM instance name associated with the data; and
a time when the data was generated or when the copy was stored, and
wherein the processing module is further configured to send the request to the CIM profile provider in response to a determination that a duration between the time when the data was generated and a moment when the CIMOM sends out the request is longer than a predetermined period of time.

7. A CIM server as recited in claim 6, further comprising a subscribing module configured to subscribe to an indication of the CIMOM via an intelligent platform management interface (IPMI) to receive the indication independently of firmware and operating system of the CIM server,
wherein the CIM caching provider is configured to receive the data from the CIM profile provider in response to the indication,
wherein the CIM caching provider is coupled with the CIMOM and the CIM profile provider through the processing module,
wherein the CIM caching provider is configured to notify the processing module in response to the indication,
wherein the processing module is configured to query the CIM profile provider to provide the data to the CIM caching provider in response to the indication to store the data as the copy,
wherein the processing module is configured to request that the CIM profile provider provide the data to the CIM caching provider in response to being notified by the CIM caching provider, and wherein the CIM caching provider is configured to store the data provided by the CIM profile provider as a copy.

8. The method as recited in claim 5, further comprising:
setting the bit indicator to indicate that the data in the copy is not available for use in response to a predetermined event occurring to the device; and
setting the bit indicator to indicate that the data in the copy is available for use in response to the data in the copy being updated after the predetermined event has occurred to the device,
wherein the predetermined event is chosen from a group consisting of: a failure of the device and a predetermined change to the device.

9. The method as recited in claim 5, further comprising subscribing to an indication of the CIMOM via an intelligent platform management interface (IPMI) to receive the indication independently of firmware and operating system of the CIM server prior to storing the data, and wherein receiving the data from the CIM profile provider further comprises:
receiving the data from the CIM profile provider in response to the indication using the CIM caching provider; and
querying the CIM profile provider to provide the data to the CIM caching provider using the CIM caching provider in response to the indication to store the data as the copy.

10. The method as recited in claim 9, further comprising:
notifying the CIM profile provider, using the CIM caching provider, to update the data as an updated copy; and
providing, using the CIM profile provider, the updated copy to the CIM caching provider in response to receiving the indication of the CIMOM.

11. The method as recited in claim 5, wherein receiving the data from the CIM profile provider further comprises sending to the CIM caching provider the request from the CIMOM according to a determination.

12. The system as recited in claim 1,
wherein a Common Information Model (CIM) caching provider is coupled with a CIM Object Manager (CIMOM) and a CIM profile provider, the CIM profile provider also being coupled to the managed device and being configured to generate the data, the CIM caching provider being configured to receive the data from the CIM profile provider, store the data as the copy, receive the request from the CIMOM, and respond with the copy in response to the request,
wherein the CIM caching provider is configured to store the copy in a compressed format,
wherein the record table comprises the data, a CIM instance name associated with the data, and a time when the data was generated or when the copy was stored,
wherein the system further comprises a subscribing module configured to subscribe to an indication of the CIMOM, wherein the CIM caching provider is configured to notify the CIM profile provider to update the data as an updated copy and provide the updated copy to the CIM caching provider in response to the subscribing module receiving the indication of the CIMOM,
wherein the logic is configured to:
set the bit indicator to indicate that the data in the copy is not available for use in response to a predetermined event occurring to the managed device; and
set the bit indicator to indicate that the data in the copy is available for use in response to the data in the copy being updated after the predetermined event has occurred to the managed device, and
wherein the predetermined event is chosen from a group consisting of: a failure of the managed device and a predetermined change to the managed device.

13. A computer program product for efficient response of a Common Information Model (CIM) server, the computer program product comprising a computer-readable storage medium having computer-readable program code embodied therewith, the computer-readable program code comprising:
computer-readable program code configured to generate data for a device coupled with the CIM server without prompting during initialization of the CIM server in order to respond to a CIM Operating Module (CIMOM);
computer-readable program code configured to subscribe to an indication of the CIMOM via an intelligent platform management interface (IPMI) to receive the indication independently of firmware and operating system of the CIM server prior to storing the data;
computer-readable program code configured to receive the data from a CIM profile provider prior to receiving a request from the CIMOM in response to the indication using a CIM caching provider and send to the CIM caching provider the request from the CIMOM according to a determination;
computer-readable program code configured to store the data as a copy prior to receiving the request from the CIMOM;
computer-readable program code configured to respond with the copy to the request from the CIMOM in response to both receiving the request and a determination that a bit indicator stored for the copy in a record table indicates that the data in the copy is available for use;
computer-readable program code configured to set the bit indicator to indicate that the data in the copy is not available for use in response to a predetermined event occurring to the device; and
computer-readable program code configured to set the bit indicator to indicate that the data in the copy is available for use in response to the data in the copy being updated after the predetermined event has occurred to the device,
wherein the predetermined event is chosen from a group consisting of: a failure of the device and a predetermined change to the device,
wherein the computer-readable program code configured to store the data as the copy and the computer-readable program code configured to respond with the copy to the request from the CIMOM is embedded in the CIM caching provider, and
wherein the computer-readable program code configured to generate data for the device coupled with the CIM server in order to respond to the CIMOM is embedded in the CIM profile provider,
wherein the copy is stored in a compressed format,
wherein the determination is based on a duration between a time when the data was generated and a moment when the CIMOM sends out the request being longer than a predetermined period of time, and
wherein the computer-readable program code configured to respond with the copy to the request from the CIMOM in response to both receiving the request and the determination that the bit indicator stored for the copy in the record table indicates that the data in the copy is available for use is further configured to send the request to the CIM profile provider in response to the duration being longer than the predetermined period of time.

14. The computer program product as recited in claim 13, wherein the computer-readable program code configured to receive the data further comprises computer-readable program code configured to query the CIM profile provider to provide the data to the CIM caching provider in response to the indication to store the data as the copy.

\* \* \* \* \*